United States Patent Office 2,990,358
Patented June 27, 1961

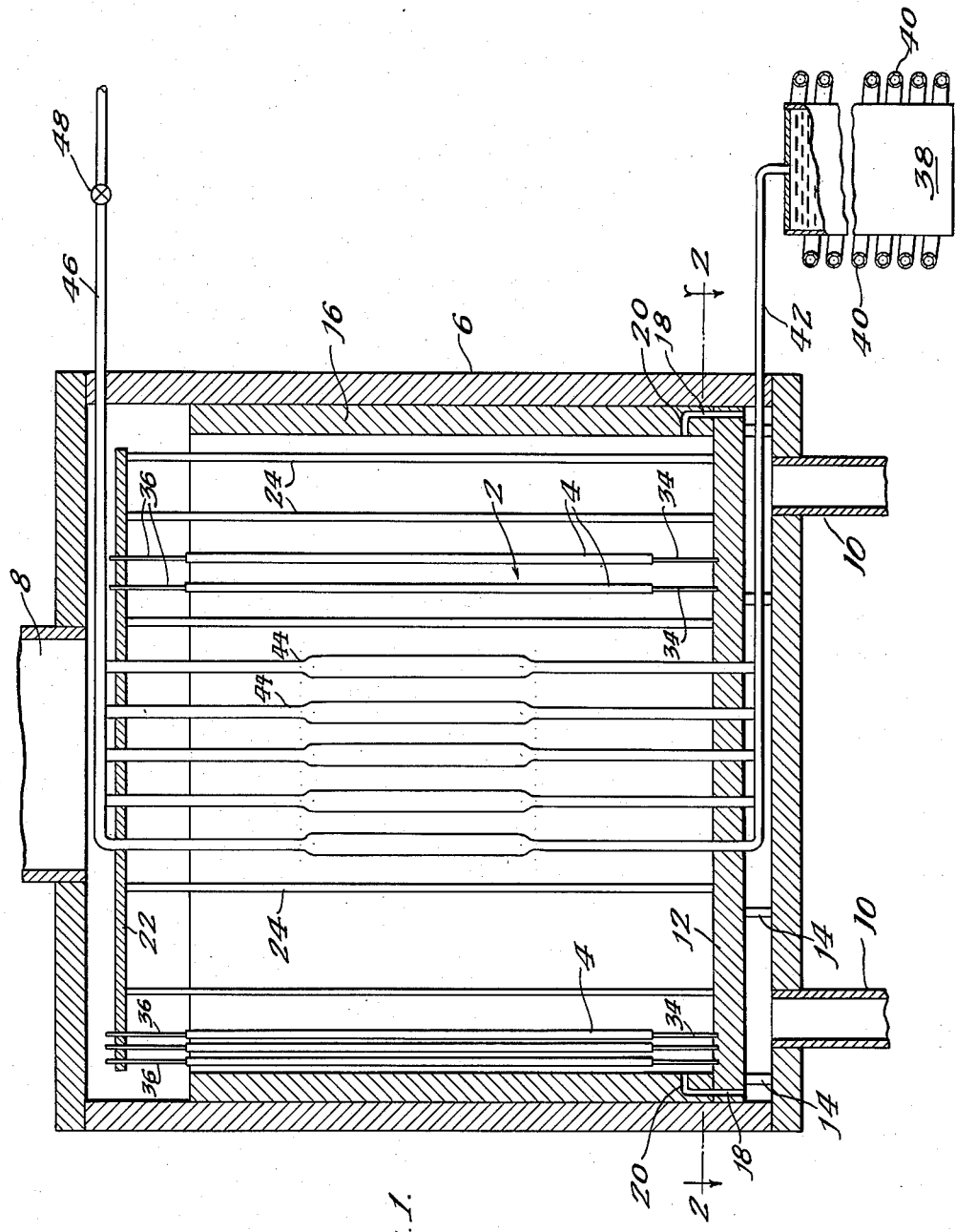

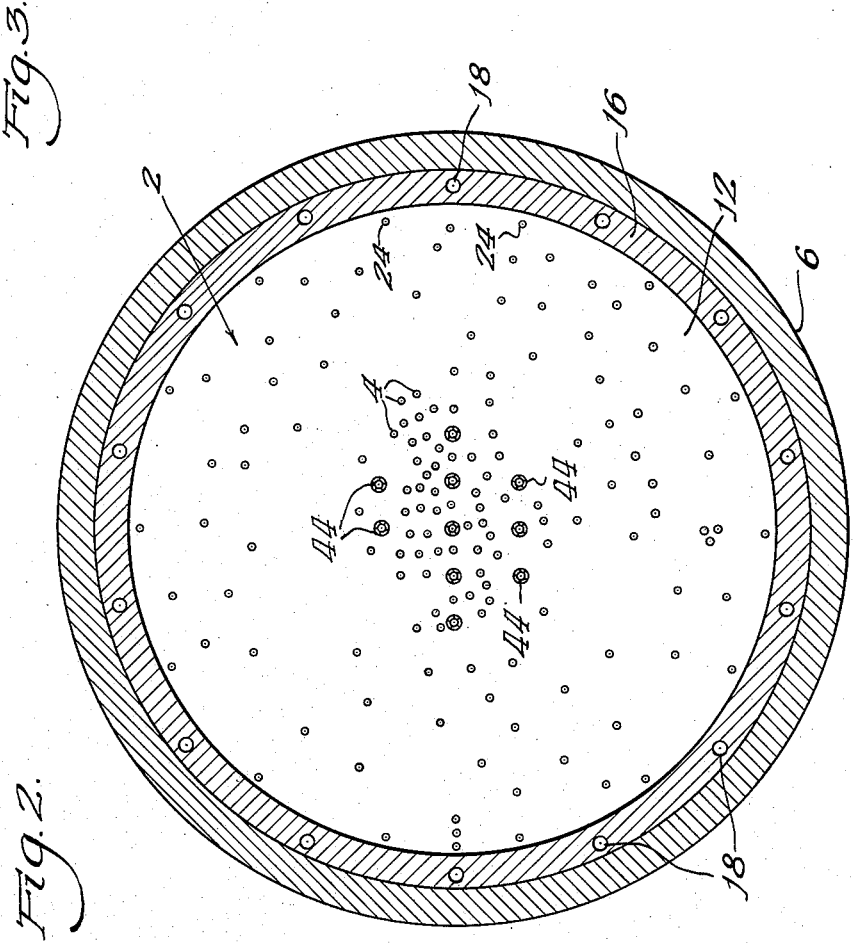

2,990,358
CONTROL MEANS FOR REACTOR
John H. Manley, Los Alamos, N. Mex., assignor to the United States of America as represented by the United States Atomic Energy Commission
Filed Apr. 29, 1947, Ser. No. 744,641
2 Claims. (Cl. 204—193.2)

This invention relates to nuclear physics and in particular to a novel method and means for controlling neutron density within a neutronic reactor undergoing a neutron fission chain reaction.

A general object of the invention is to control a neutronic reactor without utilizing mechanical means such as pumps or motors for inserting and withdrawing a control substance into and out of a neutronic reactor.

An additional object of this invention is to provide a control means whereby the neutron density in a neutronic reactor is effectively controlled by the temperature of operation of said reactor.

The foregoing and other objects and advantages of the invention will become apparent from a consideration of the following specification and accompanying drawings wherein:

FIG. 1 is a diagrammatic illustration of a neutronic reactor and associated control means embodying the invention, portions of the structure being shown in central vertical cross-section and other portions being shown in side elevation;

FIG. 2 is a cross-sectional view taken on a line 2—2 of FIG. 1;

FIG. 3 is an enlarged vertical sectional view through one of the reactor rods shown in FIGS. 1 and 2;

Figure 4:
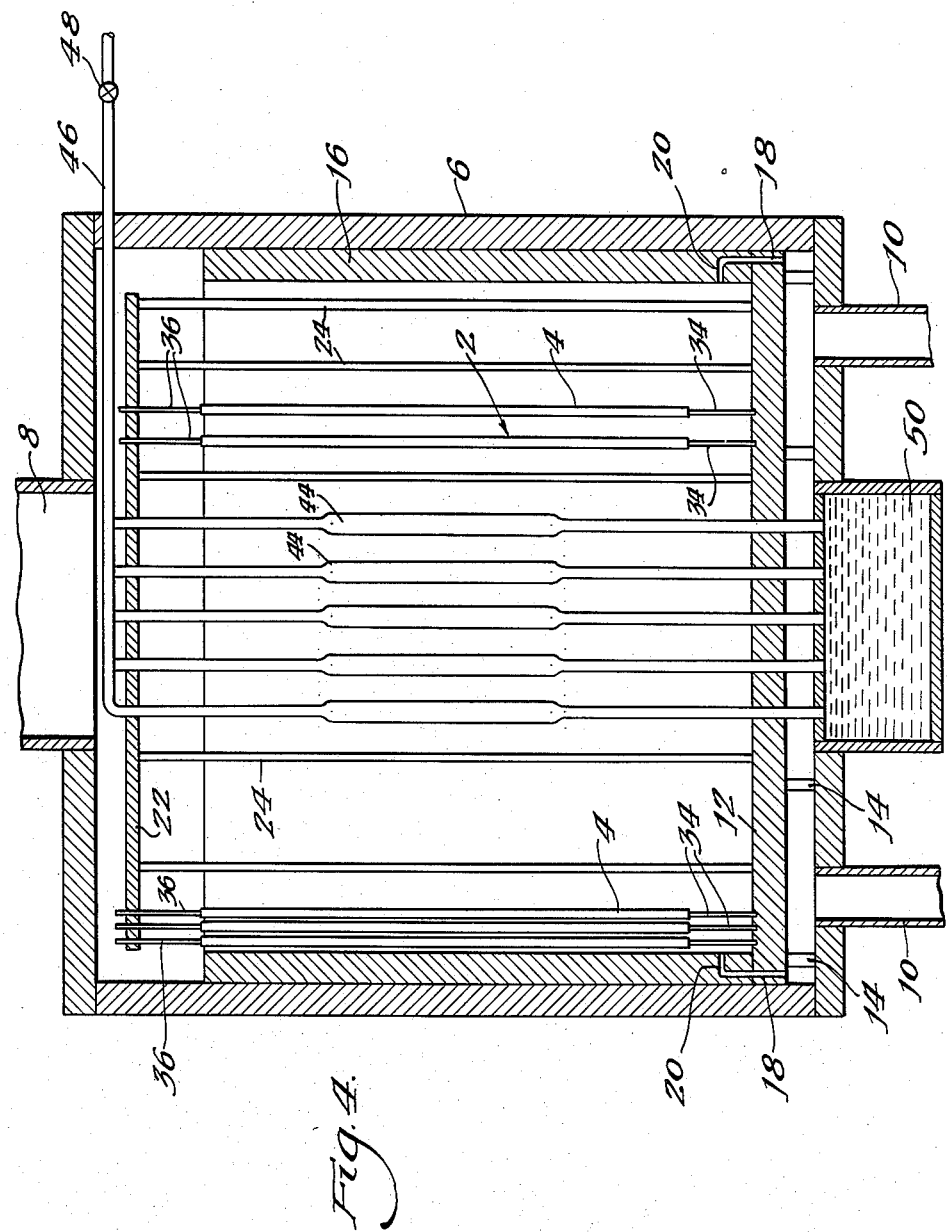
FIG. 4 is a diagrammatic illustration similar to FIG. 1 but showing a modification of the novel control means.

Describing the invention in detail and referring first to the embodiment shown thereof illustrated in FIGS. 1 to 3 inclusive, the reactor shown therein is generally designated 2 and comprises a plurality of reactive or fissionable rods 4, the composition and construction of which are hereinafter discussed. The rods, only a few of which are shown, are disposed within a cylindrical tank or container 6, preferably formed of steel and provided with top and bottom inlet and outlet conduits 8 and 10 respectively adapted to convey a coolant such as ordinary water or heavy water functioning to absorb the heat of the nuclear fission chain reaction and to moderate the neutrons taking part therein to energy values of the order of thermal energies at room temperature, i.e. .03 e.v.

The rods 4 are supported by a steel plate 12 which is seated on ribs 14 carried by the bottom wall of the tank 6. The plate 12 also abuts the bottom edge of a steel liner 16 and comprises one or more openings or ports 18 communicating with passages 20 in said liner to accommodate flow of the water from the tank 6 into the beforementioned outlet conduit 10. The upper ends of the rods 4 are supported by a steel plate 22 mounted on steel pedestals or columns 24 carried by the plate 12.

One of the rods 4 is shown in detail in FIG. 3 and comprises a cylindrical member 26 containing thermally fissionable material such as $U^{233}$, $U^{235}$ or $Pu^{239}$ enclosed within a thin-walled steel tube or sheath 28 closed at its ends by blocks or caps 30 and 32 respectively. The cap 32 is integrally formed with a steel pin 34, and the cap 30 is provided with a socket for the reception of a steel pin 36, said pins being adapted for engagement within complementary openings in the plates 12 and 22 as best seen in FIG. 1.

The rods 4, as will be understood by those skilled in the art, contain sufficient thermally fissionable material to sustain a nuclear fission chain reaction. In this connection it will be understood that the rods 4 preferably are formed of uranium containing an enriched isotopic content of thermally fissionable material to effect a relatively compact structure. It may also be noted that the size of the structure may be decreased by forming the abovementioned structural items of a material relatively nonabsorbent with respect to neutrons and preferably capable of moderating neutrons such as, for example, beryllium or machined graphite.

In this embodiment of the invention, the reaction is regulated or controlled by a body of liquid such as borinetriamine ($B_3N_3H_6$) which is highly neutron absorbent and boils at 53° C. thus volatilizing to the gaseous phase thereof. The liquid borinetriamine is stored within a tank 38 surrounded by a heating coil 40 and the tank is connected by a line 42 to a plurality of tubes or conduits 44 extending vertically through the reactor. The tubes 44 are connected to an exhaust line 46 with a normally closed conventional shut-off valve 48. In the event that it is desired to reduce the neutron reproduction ratio of the reactor in order to decrease the neutron density below unity, the coil 40 is energized to heat the liquid borinetriamine within the tank 38 thereby volatilizing this substance forcing the same upwardly through the tubes 44 to absorb neutrons at the core or central portion of the reactor wherein the neutron density is normally greatest.

It will be understood that continued heating of the tank 38 will increase the pressure of the gaseous borinetriamine within the tubes 44 thus producing greater reduction in the neutron reproduction ratio of the reactor. In this connection it may be noted that in an arrangement wherein the volume of the tubing 44 is approximately 10 liters, the filling of such tubing by the vapor at atmospheric pressure will reduce the neutron reproduction ratio about 1 percent, an amount sufficient to stop the nuclear fission chain reaction under normal conditions. Thus the system above described is adapted for terminating the chain reaction under emergency conditions wherein the ordinary control means (not shown) may have been rendered inoperative through failure of an external power source or for other reasons.

It will be understood, as is readily apparent to those skilled in the art, that other neutron absorbent substances may be used as is more fully hereinafter explained.

The proportions of fissionable material and neutron moderator necessary to sustain a chain reaction in a water moderated reactor such as that above described are fully set forth in a copending Fermi-Szilard application, now U.S. Patent 2,708,656 issued May 17, 1955.

Other thermally expansible neutron absorbent substances may be substituted for the borinetriamine such as, for example, mercury, cadmium, or boron, and other neutron absorbing material or compounds thereof.

The above-described control system is also applicable to so-called fast neutron reactors of the type disclosed in a copending Szilard application, Serial No. 698,334, filed September 20, 1946, wherein little or no neutron moderator is utilized and a relatively great amount of thermally fissionable material is utilized to sustain a chain reaction wherein the average neutron energy is above about 1,000 e.v. Such a system could be readily utilized in the arrangement of FIGS. 1 to 3 by substituting a coolant which is effectively nonmoderating such as helium for the water coolant above described, and by increasing the concentration of fissionable material to sustain the reaction as more fully discussed in the Szilard application. Under these conditions the control substance within the tank 38 would preferably be a readily volatile substance capable of moderating neutrons to a considerable extent such as, for example, ordinary water or heavy water. In such an arrangement, the reactor is constructed slightly smaller than the critical size to which the same is capable of sustaining a chain reaction, and the reaction is initiated by heating the tank 38 to volatilize the water therein causing steam to enter tubes 44 moderating neutrons within the core of the reactor and consequently raising the reproduction ratio thereof to a value greater than unity. As will be readily understood by those skilled in the art, this increase in the reproduction ratio of a reactor of this type is caused by moderating the neutrons in the core of the reactor thus reducing the critical size thereof inasmuch as the thermally fissionable material therein has a relatively great neutron fission cross-section for slow neutrons. It will be understood that any relatively volatile liquid capable of moderating neutrons may be utilized to control a fast neutron reactor.

A modification of the invention is diagrammatically illustrated in FIG. 4, wherein the tubes 44 are connected at their lower extremities to a tank or reservoir 50 of a thermally expansible neutron absorbent liquid such as those above described. Thus in the arrangement of FIG. 4, in the event that the ordinary control means should prove ineffective to regulate the reaction, the reservoir 50 and the body of liquid therein are placed in thermal contact with the emergent coolant, and are subjected to the relatively great intense neutron bombardment and heat developed thereby, thus causing the liquid to expand upwardly into the tubes 44, to terminate the reaction in the event that the temperature of the neutronic reactor or the neutron density therein should become dangerously high. It may be noted in this connection, as will be readily apparent to those skilled in the art, that the reaction is normally conducted so as to provide a neutron density which will not heat the liquid 50 to a value above that to which it will expand into the tubes 44. For example, in the case of borinetriamine, the liquid within the tank 50 would be maintained at a value below 53° C. which would, of course, afford an operating temperature at the center of the reactor considerably in excess of 53° C. inasmuch as the neutron density at the center of the reactor is much greater than that the periphery through which tank 50 is preferably located as illustrated in FIG. 4.

The above-described control means are particularly advantageous in regulating neutronic reactors such as above described, in that pumps and motors within the shielding not shown are unnecessary for the purpose of inserting the control substance into the reactor and withdrawing the control substance therefrom. This prevents inoperativeness of the control system due to irradiation of the mechanical means above mentioned. Thus the invention comprises a dependable and highly efficient system for regulating reactions of this type.

It will be understood that the above-described embodiments of the invention are merely by way of illustration and not limitation inasmuch as various and other modifications of the invention will be readily apparent to those skilled in the art without departing from the spirit of the invention or the scope of the appended claims.

What is claimed is:

1. An apparatus for controlling a neutron reactor, comprising a tank beneath the level of an active portion of a reactor and adjacent thereto, said tank having at least one tube extending from said tank into the active portion of the reactor, a thermally expansible liquid neutron absorbent material in said tank, said liquid being exposed to a beam of neutrons from said active portion whereby said absorbent material is heated, and said liquid being in said tank in quantity sufficient in relationship to the volume of said tank that at least a portion of said material will expand into the active portion through said tube as the result of the heating effect of the impingement of a predetermined neutron flux from said reactor upon the material in said tank.

2. The apparatus of claim 1 wherein the neutron absorbent material is boron triamine.

References Cited in the file of this patent
UNITED STATES PATENTS

| | | |
|---|---|---|
| 2,224,014 | Dunham et al. | Dec. 3, 1940 |
| 2,561,852 | Funsten | July 24, 1951 |
| 2,708,656 | Fermi et al. | May 17, 1955 |
| 2,735,811 | Weinberg et al. | Feb. 21, 1956 |

FOREIGN PATENTS

| | | |
|---|---|---|
| 861,390 | France | Oct. 28, 1940 |
| 233,011 | Switzerland | Oct. 2, 7944 |
| 114,151 | Australia | Nov. 13, 1941 |
| 648,293 | Great Britain | Jan. 3, 1951 |

OTHER REFERENCES

Chemical Abstracts 34, 4005 (1940), abstract of Wiberg et al., publication Ber. 73B, 209–32 (1940). (Copy in Patent Office Library.)

A General Account of the Development of Methods of Using Atomic Energy for Military Purposes Under the Auspices of the United States Government, 1940–1945, by H. D. Smyth, 1945, pp. 22, 24, 25, 41, 42, 75, 85, 152, 153, 177–180. (In Library.)

United States Atomic Energy Commission MDDC–893, Factors Involved in the Production of Atomic Power by Farrington Daniels, date declassified April 7, 1947, pp. 3, 5, 6, 7, 8, 9, 10, 11.